ial No. 865,323.

UNITED STATES PATENT OFFICE.

CHRISTOPHER H. BIERBAUM, OF BUFFALO, NEW YORK.

METHOD OF MAKING LUBRICANTS.

1,340,316.  Specification of Letters Patent.  Patented May 18, 1920.

No Drawing.   Application filed October 6, 1914. Serial No. 865,323.

*To all whom it may concern:*

Be it known that I, CHRISTOPHER H. BIERBAUM, a citizen of the United States, residing in the city of Buffalo, in the county of Erie, in the State of New York, have invented new and useful Improvements in the Methods of Making Lubricants.

The present invention provides a method for combining wet natural or flocculated graphite with a solution of asphaltum and rendering the graphite in a condition where it is ready to mix with oil or grease without first drying the graphite. It also provides for purifying and washing the graphite in the same process.

It is generally known by those skilled in the art, that a relatively small amount of graphite introduced into lubricating oils, is desirable, and it is also desirable that this graphite should be ground or intimately mixed with a solution of asphaltum. The process of grinding and combining graphite with asphaltum is disclosed in my United States Patent No. 1,186,167, issued June 16, 1916.

In many cases it is highly desirable to grind the graphite to an extremely fine and uniform degree, especially where the graphite is used in lubricating oil, which is being recovered from the bearings, filtered, and then used again. In order to prevent the graphite from being filtered out it is necessary that the graphite should be ground sufficiently fine in order for it to pass through the filter. The solution of asphaltum with which the graphite has been ground or intimately mixed of course remains in solution in the oil and therefore is not affected by repeated filtrations.

The advantages of grinding graphite in water are: first, that of enabling very fine grinding, and secondly, permitting grading the ground product economically by partial sedimentation. These operations are such that anyone experienced in preparing finely ground materials, can perform them. The difficulty, however, arises when a material which has been finely ground in water is subsequently to be introduced into oil or grease, owing to the fact that water will not naturally mix with oil or grease, on the other hand, if the finely ground graphite is dried, it becomes a hardened mass and requires regrinding when introduced into oil or grease.

The present invention overcomes the foregoing difficulties in the treatment of the natural graphite after it has been ground in water. The grinding can be done on almost any of the well known grinding machines now commonly used for grinding enamel paints, water colors and fine pigments. The necessary grinding operation, therefore can be performed by any one familiar in the art of fine grinding. After the graphite is ground and in the state of a wet paste it is placed in an ordinary paint mixer and a solution of asphaltum is then added to this paste in the proportions of say, 10 pounds of graphite (dry weight) to $6\frac{1}{2}$ pounds of the asphaltum solution. This mixer can be either a hand or power mixing machine such as is now generally used for the mixing of paints. While the process of mixing progresses, the graphite and asphaltum unite and the water gradually separates out. This is due to the fact that the affinity existing between asphaltum and graphite is greater than that between graphite and water. After the mixing or agitating process has been continued, more and more of the water separates out and at the same time the earthy materials such as clay, sand and the like whose affinity for water is greater than for asphaltum, do not unite with the asphaltum, and therefore do not enter the asphaltum graphite paste. The graphite having been ground to a very fine state, these impurities present in the graphite are likewise ground to a very fine state, for this reason these impurities remain in suspension in the water quite readily and therefore can be eliminated by simply pouring off the water which has separated out from the paste. This washing process may then be continued by adding a fresh supply of water to the graphite paste in the mixer and after agitation has continued. The water again becomes roily as long as further impurities exist and may then be again poured off. This process of washing may be continued to produce any desired degree of purity of the material.

As is well known, some of the highest grades of graphite contain impurities consisting of earthy materials, and in many cases these impurities are of sufficient importance to detract from their lubricating value. This is the case with some of the natural amorphous graphites having otherwise the highest lubricating value. These natural amorphous graphites lend themselves most successfully to this washing or purifying process.

In many cases where the dry graphite already exists in a finely divided state and where no further grinding is necessary, this graphite may then also be purified in a manner similar to that which has been ground in water, namely, by thoroughly wetting the powdered graphite with water and then treating the resulting paste in a manner already described. It is essential, however, that the graphite should be thoroughly and completely wetted, in that a particle of impurity left dry will not separate out in the presence of the asphaltum solution, since under these conditions it will adhere to the asphaltum and resist all further efforts of separation. For the same reason if dry graphite is mixed with an asphaltum solution, the resulting paste cannot be washed free of its impurities in a manner already described. The best results, however, can be obtained by having the graphite thoroughly wetted, though without having an undue excess of water present, a paste of the consistency approximating cream seems the most desirable; to this should be added the solution of asphaltum, while the wet graphite is being agitated in a mixer, in a manner described.

It is essential that only the proper quantity of asphaltum solution should be used, in that the best results can be obtained at or near what may be called a saturation point, that is, having present an amount of asphaltum that can hold and bind all of the graphite and at the same time not sufficient to also hold the impurities for which it has less affinity. The process of eliminating the water from the original wet graphite paste should be arrested when the affinity of graphite for asphaltum has been satisfied by not having sufficient asphaltum present to satisfy the affinity of the impurities also; dehydrating and purifying are therefore substantially simultaneous results in this process.

The proper amount of asphaltum to be used can be determined experimentally by placing the wet graphite paste in the mixer and then adding an amount of this solution substantially in the proportions hereinbefore given, adding the last part of the asphaltum very slowly. The mass after agitation will at first assume a curdy condition, and then by slowly increasing the amount of asphaltum, the material will gradually "gather" and form one continuous lump, having the consistency of dough, this constitutes the saturation point and after this no more asphaltum should be added.

After the washing is completed a small amount of lubricating oil or additional asphaltum solution is added to reduce the stiff graphite asphaltum paste to a semi-fluid mass in a condition for final thorough mixing. This last mixing process can conveniently be done on a standard grinding machine now commonly in use in the preparations of paints and pigments, preferably the kind having smooth parallel cylindrical granite rolls.

It is evident that modifications may be made of the foregoing process and yet embody the spirit of this invention. Oil or in some cases grease may be added to advantage during the process of either mixing or washing. It is essential that no constituent should be added which is miscible with water and a solvent for asphaltum; the asphaltum should be pure to the extent of not containing anything having affinity or miscibility with water; on the other hand the water should be pure and contain nothing having a high affinity for asphaltum.

I am aware that it has been proposed to deflocculate graphite and other amorphous bodies by incorporating therewith an aqueous solution of tannin, gallotannic acid or equivalent re-agent; and also, that it has been proposed to produce a lubricant-mixture by preparing a paste containing such deflocculated graphite and water and then working said paste in presence of oil or other non-aqueous medium to displace the water.

I have found by numerous experiments that such deflocculating material has the effect of causing such impurities, as clay and the like to remain suspended in the water. In my process, the water is substantially pure and wholly free from deflocculating agents, with the result that the impurities remain in the water and are separated from the graphite.

What I claim as new and desire to cover by United States Patent is:

1. The herein described method of purifying or freeing flocculated graphite from its earthy substances or impurities, which consists in mixing with the impure flocculated graphite a sufficient quantity of water to satisfy the affinity of the graphite and its impurities, adding to the mixture a substance having a greater affinity for the graphite than for the impurities in sufficient quantity to satisfy the affinity of the graphite only, agitating the mixture, and removing the separated impurities from the remainder of the mixture.

2. The herein described method of dehydrating and purifying a wet mass of pulverized natural graphite, which consists in mixing said mass with a solution of asphaltum and oil, agitating said mixture to separate the water and contained impurities therefrom, and removing the water and its impurities.

3. The herein described method of dehydrating and purifying a wet mass of pulverized graphite, which consists in mixing said mass with a solution of asphaltum, agitating said mixture to separate the water and contained impurities therefrom, and removing the water and its impurities.

4. The herein described method of freeing natural flocculated graphite from its earthy substances or impurities, which consists in mixing with the impure flocculated graphite a quantity of water free from deflocculating material, sufficient to satisfy the affinity of the graphite and its impurities, adding to the mixture a hydrocarbonous substance having a greater affinity for the graphite than for the impurities in sufficient quantity to satisfy the affinity of the graphite, agitating the mixture, and removing the separated impurities from the remainder of the mixture.

CHRISTOPHER H. BIERBAUM.

Witnesses:
C. M. STREETS,
B. S. S. LINETTY.